(12) United States Patent
Sharma et al.

(10) Patent No.: US 7,953,943 B2
(45) Date of Patent: *May 31, 2011

(54) EPOCH-BASED MUD LOGGING

(75) Inventors: Samar Sharma, San Jose, CA (US);
Dinesh G. Dutt, Sunnyvale, CA (US);
Fabio R. Maino, Palo Alto, CA (US);
Sanjaya Kumar, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 12/506,975

(22) Filed: Jul. 21, 2009

(65) Prior Publication Data

US 2009/0287892 A1    Nov. 19, 2009

Related U.S. Application Data

(63) Continuation of application No. 11/494,036, filed on Jul. 26, 2006, now Pat. No. 7,568,078.

(51) Int. Cl.
*G06F 13/00* (2006.01)
(52) U.S. Cl. ........................................ 711/156; 711/162
(58) Field of Classification Search .................. 711/156, 711/162
See application file for complete search history.

(56) References Cited

U.S. PATENT DOCUMENTS

| 7,433,948 | B2 | 10/2008 | Edsall et al. |
| 2005/0235139 | A1 | 10/2005 | Hoghaug et al. |
| 2007/0094464 | A1 | 4/2007 | Sharma et al. |
| 2009/0259817 | A1* | 10/2009 | Sharma et al. ................ 711/162 |

OTHER PUBLICATIONS

Notice of Allowance and Allowed Claims dated Mar. 3, 2009 from U.S. Appl. No. 11/494,036; 11 pgs.

* cited by examiner

*Primary Examiner* — Reba I Elmore
(74) *Attorney, Agent, or Firm* — Weaver Austin Villeneuve & Sampson LLP

(57) ABSTRACT

In one embodiment, a MUD logger receives a notification from another MUD logger maintaining another MUD log for a volume, the notification indicating one or more modifications to be made to a MUD log maintained by the MUD logger receiving the notification, wherein the MUD log includes information for one or more epochs, wherein the information for each of the epochs indicates a set of one or more regions of the volume that have been modified during the corresponding epoch. The MUD logger updates the MUD log associated with the volume, wherein updating the MUD log is performed in response to the notification.

25 Claims, 9 Drawing Sheets

MUD Log – Volume A 302

Epoch 1 – Set of segments modified during Epoch 1

Epoch 2 – Set of segments modified during Epoch 2

Epoch 3 – Set of segments modified during Epoch 3

.
.
.

Epoch N – Set of segments modified during Epoch N

FIG. 3

Set of segments modified during an epoch

| Epoch A | Epoch B |
|---------|---------|
| 0 0 0 0 0 1 | 0 0 0 0 0 0 |
| 1 1 0 0 0 0 | 0 0 0 0 0 0 |
| 0 0 0 0 0 0 | 0 1 1 1 0 0 |
| 0 0 0 0 0 0 | 0 0 0 0 0 0 |
| 0 0 0 0 0 0 | 0 0 1 0 0 0 |
| 0 0 0 0 0 1 | 0 0 0 0 1 1 |

FIG. 7A

| Epoch A | | Epoch B | | Merged Epochs A and B |
|---------|---|---------|---|-----------------------|
| 0 0 0 0 0 1 | | 0 0 0 0 0 0 | | 0 0 0 0 0 1 |
| 1 1 0 0 0 0 | | 0 0 0 0 0 0 | | 1 1 0 0 0 0 |
| 0 0 0 0 0 0 | OR | 0 1 1 1 0 0 | = | 0 1 1 1 0 0 |
| 0 0 0 0 0 0 | | 0 0 0 0 0 0 | | 0 0 0 0 0 0 |
| 0 0 0 0 0 0 | | 0 0 1 0 0 0 | | 0 0 1 0 0 0 |
| 0 0 0 0 0 1 | | 0 0 0 0 1 1 | | 0 0 0 0 1 1 |

FIG. 7B

EPOCH-BASED MUD LOGGING

RELATED APPLICATIONS

This application is a continuation application and claims priority of U.S. patent application Ser. No. 11/494,036, entitled, "EPOCH-BASED MUD LOGGING," by Sharma et al, filed on Jul. 26, 2006, which is incorporated by reference for all purposes.

BACKGROUND OF THE INVENTION

1. Technical Field

The present invention relates to network technology. More particularly, the present invention relates to methods and apparatus for implementing MUD logging in a system implementing virtualization of storage within a storage area network.

2. Description of the Related Art

In recent years, the capacity of storage devices has not increased as fast as the demand for storage. Therefore a given server or other host must access multiple, physically distinct storage nodes (typically disks). In order to solve these storage limitations, the storage area network (SAN) was developed. Generally, a storage area network is a high-speed special-purpose network that interconnects different data storage devices and associated data hosts on behalf of a larger network of users. However, although a SAN enables a storage device to be configured for use by various network devices and/or entities within a network, data storage needs are often dynamic rather than static.

The concept of virtual memory has traditionally been used to enable physical memory to be virtualized through the translation between physical addresses in physical memory and virtual addresses in virtual memory. Recently, the concept of "virtualization" has been implemented in storage area networks through various mechanisms. Virtualization interconverts physical storage and virtual storage on a storage network. The hosts (initiators) see virtual disks as targets. The virtual disks represent available physical storage in a defined but somewhat flexible manner. Virtualization provides hosts with a representation of available physical storage that is not constrained by certain physical arrangements/allocation of the storage.

Virtualization in the storage array is one of the most common storage virtualization solutions in use today. Through this approach, virtual volumes are created over the storage space of a specific storage subsystem (e.g., disk array). Creating virtual volumes at the storage subsystem level provides host independence, since virtualization of the storage pool is invisible to the hosts. In addition, virtualization at the storage system level enables optimization of memory access and therefore high performance. However, such a virtualization scheme typically will allow a uniform management structure only for a homogenous storage environment and even then only with limited flexibility. Further, since virtualization is performed at the storage subsystem level, the physical-virtual limitations set at the storage subsystem level are imposed on all hosts in the storage area network. Moreover, each storage subsystem (or disk array) is managed independently. Virtualization at the storage level therefore rarely allows a virtual volume to span over multiple storage subsystems (e.g., disk arrays), thus limiting the scalability of the storage-based approach.

When virtualization is implemented on each host, it is possible to span multiple storage subsystems (e.g., disk arrays). A host-based approach has an additional advantage, in that a limitation on one host does not impact the operation of other hosts in a storage area network. However, virtualization at the host-level requires the existence of a software layer running on each host (e.g., server) that implements the virtualization function. Running this software therefore impacts the performance of the hosts running this software. Another key difficulty with this method is that it assumes a prior partitioning of the available storage to the various hosts. Since such partitioning is supported at the host-level and the virtualization function of each host is performed independently of the other hosts in the storage area network, it is difficult to coordinate storage access across the hosts. The host-based approach therefore fails to provide an adequate level of security. Due to this security limitation, it is difficult to implement a variety of redundancy schemes such as RAID which require the "locking" of memory during read and write operations. In addition, when mirroring is performed, the host must replicate the data multiple times, increasing its input-output and CPU load, and increasing the traffic over the SAN.

Virtualization in a storage area network appliance placed between the hosts and the storage solves some of the difficulties of the host-based and storage-based approaches. The storage appliance globally manages the mapping and allocation of physical storage to virtual volumes. Typically, the storage appliance manages a central table that provides the current mapping of physical to virtual. Thus, the storage appliance-based approach enables the virtual volumes to be implemented independently from both the hosts and the storage subsystems on the storage area network, thereby providing a higher level of security. Moreover, this approach supports virtualization across multiple storage subsystems. The key drawback of many implementations of this architecture is that every input/output (I/O) of every host must be sent through the storage area network appliance, causing significant performance degradation and a storage area network bottleneck. This is particularly disadvantageous in systems supporting a redundancy scheme such as RAID, since data must be mirrored across multiple disks. In another storage appliance-based approach, the appliance makes sure that all hosts receive the current version of the table. Thus, in order to enable the hosts to receive the table from the appliance, a software shim from the appliance to the hosts is required, adding to the complexity of the system. Moreover, since the software layer is implemented on the host, many of the disadvantages of the host-based approach are also present.

Patent application Ser. No. 10/056,238, entitled "Methods and Apparatus for Implementing Virtualization of Storage in a Storage Area Network," by Edsall et al, filed on Jan. 23, 2002, discloses a system in which network-based virtualization is supported. In other words, virtualization is supported in the network, rather than at the hosts or storage devices. In this system, virtualization is supported by one or more network devices placed in a data path between the hosts and the storage devices. More particularly, virtualization may be implemented on a per-port basis via "intelligent ports."

In a system implementing storage virtualization, virtual volumes are typically created over the storage space of a specific storage subsystem (e.g., disk array). More particularly, data is often mirrored across multiple storage devices (e.g., disks) such that the same data is stored across each of the storage devices. Storage devices storing the same data are typically referred to as mirrors. Through the use of mirroring, redundancy may be accomplished. As a result, the data that is stored in each of the mirrors will remain accessible to hosts in the event of a problem with one of the mirrors.

In the event that one of the storage devices goes offline, it is desirable to bring the storage device up to date when the storage device is brought back online. This process typically involves copying all of the data from one of the mirrors to the temporarily detached mirror. Unfortunately, this process could take hours. As a result, the host will typically detect a disruption to data access.

In order to alleviate the need to copy all of the data from a mirror during the recovery process, a Modified User Data (MUD) log is often used. A MUD log is typically maintained on a per-mirror basis. In other words, a separate log is maintained for each storage device. While this MUD logging process is effective for systems implementing disk-based virtualization, this type of process is ineffective in a system implementing network-based virtualization.

In a system in which a volume is exported by multiple network devices or multiple ports that may implemented on different network devices, the standard MUD logging process is ineffective. More particularly, write commands may be sent via different intelligent ports, as well as different network devices. Although the data in a volume could be modified through several intelligent ports or network devices, the intelligent ports or network devices cannot coordinate amongst themselves to maintain a consistent MUD log for the volume. As a result, managing and maintaining MUD logs becomes a difficult process.

BRIEF DESCRIPTION OF THE DRAWINGS

FIG. 3 is a diagram illustrating a MUD log that may be maintained in accordance with one embodiment.

FIG. 4 is a diagram illustrating an example bit map that may be associated with an epoch in accordance with one embodiment.

FIG. 7A is an example diagram illustrating the information for two different epochs.

FIG. 7B is an example diagram illustrating a mechanism for merging two or more epochs.

DESCRIPTION OF EXAMPLE EMBODIMENTS

Figure 1:
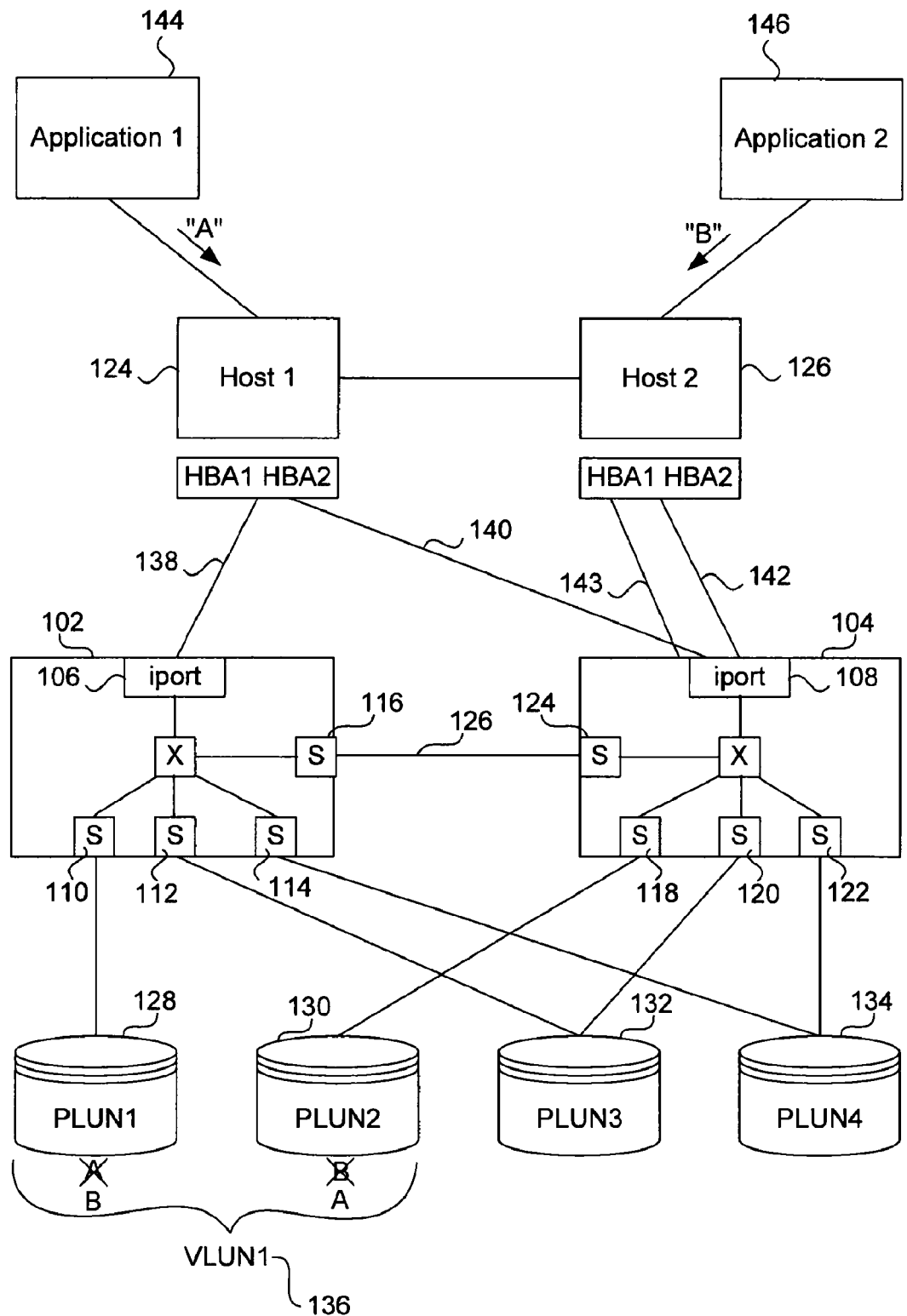
FIG. 1 is a block diagram illustrating an example system architecture in which various embodiments may be implemented.

In the following description, numerous specific details are set forth in order to provide a thorough understanding of the disclosed embodiments. It will be obvious, however, to one skilled in the art, that the disclosed embodiments may be practiced without some or all of these specific details. In other instances, well-known process steps have not been described in detail in order not to unnecessarily obscure the disclosed embodiments.

Overview

In one embodiment, a MUD logger receives a notification from another MUD logger maintaining another MUD log for a volume, the notification indicating one or more modifications to be made to a MUD log maintained by the MUD logger receiving the notification, wherein the MUD log includes information for one or more epochs, wherein the information for each of the epochs indicates a set of one or more regions of the volume that have been modified during the corresponding epoch. The MUD logger updates the MUD log associated with the volume, wherein updating the MUD log is performed in response to the notification.

Specific Example Embodiments

The disclosed embodiments may support MUD logging in a system implementing virtualization. More particularly, the embodiments described herein may be implemented in a system implementing network-based virtualization. In a system implementing network-based virtualization, virtualization may be implemented across multiple ports and/or network devices such as switches or routers that are in the path between hosts and storage devices. As a result, write commands addressed to a volume may be intercepted by different network devices (e.g., switches, routers, etc.) and/or ports.

In accordance with one aspect, MUD logging for a volume is performed by two or more MUD loggers. Each of the MUD loggers therefore maintains a separate MUD log. Information pertinent to the MUD log may also be transmitted between or among the MUD loggers, enabling the MUD loggers to update their MUD logs. Since communication is supported among the MUD loggers, each MUD logger may maintain an updated MUD log.

In accordance with one embodiment, the MUD loggers include a master MUD logger and one or more secondary MUD loggers. The master MUD logger is responsible for notifying one or more of the secondary MUD loggers when a modification is to be made to the MUD log maintained by the secondary MUD loggers (e.g., as a result of a write command addressed to the volume). In addition, each secondary MUD logger may communicate with the master MUD logger regarding modifications to the MUD log initiated by the secondary MUD logger (e.g., as a result of a write command intercepted by the secondary MUD logger), enabling the master MUD logger to notify any remaining secondary MUD loggers that export the volume.

In accordance with another aspect, communication among MUD loggers is achieved by sending a notification from one MUD logger to one or more other MUD loggers. This notification may indicate the changes to be made to the MUD log, or may notify the other MUD logger(s) of a write that has been performed (or a write command that has been received), resulting in one or more modifications to one or more regions of a volume. In accordance with one embodiment, a notification may be sent by a master MUD logger to one or more secondary MUD loggers or, alternatively, a notification may be sent by a secondary MUD logger to the master MUD logger. An acknowledgement of such a notification may be sent in response to the notification.

In accordance with yet another aspect, each MUD log includes information for one or more epochs, where the information for each of the epochs indicates a set of one or more regions that have been modified during the corresponding epoch. The information for a particular epoch may be implemented in a variety of ways. In accordance with one embodiment, the information is stored in a bit map including a plurality of bits, where each bit corresponds to a different region of the volume. Each bit of the bit map therefore indicates whether the corresponding region has been modified during the corresponding epoch.

In accordance with another embodiment, a notification is sent only where the corresponding region of the volume has not yet been modified during the epoch. In other embodiments, a notification is sent regardless of whether the region of the volume has already been modified during the epoch. In these instances, the MUD logger receiving the notification may determine whether it needs to modify its local MUD log.

In accordance with one aspect, a MUD logger maintains a MUD log associated the volume, wherein the MUD log includes information for one or more epochs, where the information for each of the epochs indicates a set of one or more regions that have been modified during the corresponding epoch. The MUD logger may also send a notification to another MUD logger. The notification may indicate one or more modifications to be made to a MUD log maintained by the MUD logger receiving the notification. The notification may also indicate one or more regions of the volume that have been modified during the current epoch (e.g., which may or may not warrant modification to a MUD log, depending upon previous modifications to the volume and MUD log during the epoch).

In accordance with another aspect, a MUD logger updates its MUD log associated with a volume that it exports, as appropriate. Updating may include a variety of operations, such as merging two or more epochs, deleting (e.g., clearing) an epoch, and generating a new epoch.

In accordance with another embodiment, a particular event may define the start of a new epoch. Such events may include, for example, the attachment of a mirror, the reattachment of a mirror, or the detachment of a mirror. By defining events in this manner, it is possible to track a period of time during which a mirror is non-functional. In this manner, modifications made to a volume during a particular epoch may be tracked in an efficient manner in order to update the mirror when it is reattached. Accordingly, mirrors may be efficiently updated without requiring unnecessary data to be restored.

In accordance with one aspect, two or more MUD loggers export a volume. Each MUD logger may be implemented in a variety of ways. For instance, each MUD logger may be implemented at a separate network device. As another example, each MUD logger may be implemented via a separate port of a network device such as a switch or router.

In accordance with one embodiment, each of the MUD loggers is implemented at a different one of the ports that exports the volume. Since a volume may be exported by multiple ports, each of the ports maintains a separate MUD log. In order to enable the information maintained at each port to be updated and remain current, communication between or among the ports may be supported, as will be described in further detail below.

The ports that export a particular volume may be implemented in one or more network devices within the network. In accordance with one embodiment, the ports may be intelligent ports (i.e., I-ports) implemented in a manner such as that disclosed in patent application Ser. No. 10/056,238, entitled "Methods and Apparatus for Implementing Virtualization of Storage in a Storage Area Network," by Edsall et al, filed on Jan. 23, 2002. An I-port may be implemented as a master port, which may send commands or information to other I-ports. In contrast, an I-port that is not a master port may contact the master port for a variety of purposes, but cannot contact the other I-ports. In a Fibre Channel network, the master I-port for a particular volume may maintain the identity of the other I-ports that also export the volume in the form of a World Wide Name (WWN) and/or Fibre Channel Identifier (FCID). Similarly, the other I-ports that export the volume may maintain the identity of the master I-port in the form of a WWN and/or FCID. In other embodiments, it is contemplated that the system does not include a master I-port, and therefore the I-ports maintain the identity of the other I-ports that export the volume to which they send notifications.

In accordance with one embodiment, a master port functions as a master port for purposes of MUD logging. In addition, the master port may also function as a master port for purposes of implementing virtualization functionality. More particularly, a master port may be implemented in a manner such as that disclosed in patent application Ser. No. 10/056,238, entitled "Methods and Apparatus for Implementing Virtualization of Storage in a Storage Area Network," by Edsall et al, filed on Jan. 23, 2002.

In accordance with one embodiment, a storage area network may be implemented with virtualization switches adapted for implementing virtualization functionality, as well as with standard switches. FIG. 1 is a block diagram illustrating an example system architecture in which various embodiments may be implemented. In this example, two virtualization switches 102 and 104 are implemented to support transmission of frames within the storage area network. Each virtualization switch may include one or more "intelligent" ports as well as one or more standard ports. More specifically, the virtualization switches 102 and 104 in this example each have an intelligent port 106 and 108, respectively. In addition, each of the virtualization switches 102 and 104 has multiple standard ports 110, 112, 114, 116 and 118, 120, 122, 124, respectively.

In order to support the virtual-physical mapping and accessibility of memory by multiple applications and/or hosts, it is desirable to coordinate memory accesses between the virtualization switches 102 and 104. Communication between the switches 102 and 104 may be accomplished by an inter-switch link 126 between two switches. As shown, the inter-switch link 126 may be between two standard ports. In other words, synchronization of memory accesses by two switches merely requires communication between the switches. This communication may be performed via intelligent virtualization ports, but need not be performed via a virtualization port or between two virtualization ports.

Virtualization of storage is performed for a variety of reasons, such as mirroring. For example, consider four physical Logical Units (LUNs) LUNs, PLUN1 128, PLUN2 130, PLUN3 132, and PLUN4 134. It is often desirable to group two physical LUNs for the purpose of redundancy. Thus, as shown, two physical LUNs, PLUN1 128 and PLUN2 130 are represented by a single virtual LUN, VLUN1 136. When data is mirrored, the data is mirrored (e.g., stored) in multiple physical LUNs to enable the data to be retrieved upon failure of one of the physical LUNs.

Various problems may occur when data is written to or read from one of a set of "mirrors." For instance, multiple applications running on the same or different hosts, may simultaneously access the same data or memory location (e.g., disk location or disk block), shown as links 138, 140. Similarly, commands such as read or write commands sent from two different hosts, shown at 138, 140 and 142, 143 may be sent in the same time frame. Each host may have corresponding Host Bus Adapters (HBA) as shown. Ideally, the data that is accessed or stored by the applications or hosts should leave the mirrors intact. More particularly, even after a write operation to one of the mirrors, the data stored in all of the mirrors should remain consistent. In other words, the mirrors should continue to serve as redundant physical LUNs for the other mirrors in the event that one of the mirrors should fail.

In conventional systems in which mirroring is enabled, a relatively simultaneous access by two different sources often results in an inherent race condition. For instance, consider the situation when two different clients send a write command to the same virtual LUN. As shown, application 1 144 running on Host 1 124 sends a write command with the data "A," while application 2 146 running on Host 2 126 sends a write command with the data "B." If the first application 144 sends data "A" to VLUN1 136 first, the data "A" may be written, for example, to PLUN1 128. However, before it can be mirrored to PLUN2 130, the second application 146 may send data "B." Data "B" may be written to PLUN2 130 prior to being mirrored to PLUN1 128. Data "A" is then mirrored to PLUN2 130. Similarly, data "B" is mirrored to PLUN1 128. Thus, as shown, the last write operation controls the data to be stored in a particular physical LUN. In this example, upon completion of both mirror operations, PLUN1 128 stores data "B" while PLUN2 130 stores data "A." Thus, the two physical LUNs no longer mirror one another, resulting in ambiguous data.

In order to solve the inherent race condition present in conventional systems, the virtualization ports communicate with one another, as described above, via an inter-switch link such as 126. In other words, the ports synchronize their access of virtual LUNs with one another. This is accomplished, in one embodiment, through the establishment of a single master virtualization port that is known to the other virtualization ports as the master port. The identity of the master port may be established through a variety of mechanisms. As one example, the master port may send out a multicast message to the other virtualization ports indicating that it is the master virtualization port. As another example, the virtualization ports may be initialized with the identity of the master port. In addition, in the event of failure of the master virtualization port, it may be desirable to enable one of the slave virtualization ports to substitute as a master port.

The master virtualization port may solve the problem caused due to the inherent race condition in a variety of ways. One solution is a lock mechanism. An alternative approach is to redirect the SCSI command to the master virtualization port, which will be in charge of performing the virtual to physical mapping as well as the appropriate interlocking. The slave port may then learn the mapping from the master port as well as handle the data.

Prior to accessing a virtual LUN, a slave virtualization port initiates a conversation with the master virtualization port to request permission to access the virtual LUN. This is accomplished through a locking mechanism that locks access to the virtual LUN until the lock is released. For instance, the slave virtualization port (e.g., port 106) may request the grant of a lock from the master virtualization port (e.g., port 108). The master virtualization port then informs the slave virtualization port when the lock is granted. When the lock is granted, access to the corresponding physical storage locations is "locked" until the lock is released. In other words, the holder of the lock has exclusive read and/or write access to the data stored in those physical locations. In this example, data "A" is then stored in both physical LUN1 128 and physical LUN2 130. When the slave virtualization port 106 receives a STATUS OK message indicating that the write operation to the virtual LUN was successful, the lock may be released. The master virtualization port 108 may then obtain a lock to access of the virtual LUN until data "B" is stored in both mirrors of the VLUN1 136. In this manner, virtualization ports synchronize access to virtual LUNs to ensure integrity of the data stored in the underlying physical storage mediums.

In accordance with one embodiment, slave and master virtualization ports may be configured or adapted for performing MUD logging operations such as those described herein. More particularly, select MUD logging ports may each maintain a respective separate MUD log, as well as communicate with one another regarding MUD logging processes, as will be described in further detail below.

In accordance with one aspect, MUD logging is performed for one or more epochs. An epoch may be defined as a period of time. The beginning of the epoch may be marked by a particular event. Similarly, the end of an epoch may also be marked by a specific event. In this manner, an epoch may be defined by one or more events. An event may be, for example, the attachment of a mirror (or disk), detachment (or failure) of a mirror, or reattachment of a mirror. Thus, each epoch may have one or more events associated therewith.

Figure 2:
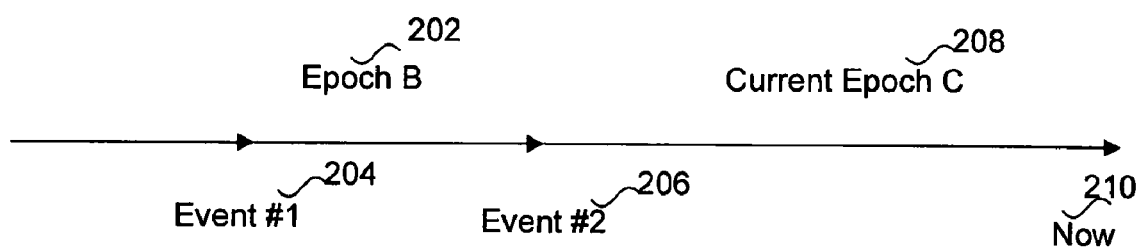
FIG. 2 is an example timeline illustrating a plurality of epochs.

FIG. 2 is an example timeline illustrating a plurality of epochs. As shown in FIG. 2, Epoch B 202 begins at Event #1 204 and ends at Event #2 206. Epoch C 208 begins at Event #2 206 and continues up until the present time 210. For instance, Event #1 204 may be defined by the detachment of a mirror, while Event #2 206 may be defined by the reattachment of the mirror. Therefore, Epoch B 202 may define the time during which the mirror has been detached. As a result, it may be desirable to obtain the MUD logging information associated with Epoch B from one of the MUD loggers in order to determine which segments of data have been modified during this period of time. These segments of data may then be copied to the newly reattached mirror from another one of the mirrors. It is important to note that it is unnecessary to copy data other than that for the segments of data that have been modified during this particular epoch.

In accordance with one embodiment, the MUD logs maintained by each MUD logger (e.g., port) are epoch-based. FIG. 3 is a diagram illustrating a MUD log that may be maintained by a MUD logger in accordance with one embodiment. As shown in FIG. 3, a MUD log 302 may be maintained for one or more volumes. The MUD log 302 may be implemented via an object-oriented data structure, linked list and/or other suitable data structure.

In this example, the MUD log 302 is maintained for a volume, Volume A. The MUD log includes information for one or more epochs. In this example, the MUD log includes information for a plurality of epochs, Epoch 1, Epoch 2, Epoch 3 .... Epoch N. The information for each of the epochs indicates a set of one or more regions of the volume that have been modified during the corresponding epoch.

The information indicating those regions of the volume that have been modified may be implemented in a variety of ways. For instance, the regions that have been modified may be identified in a list. Alternatively, regions that have not been modified may be identified in a list. In accordance with one embodiment, the set of regions of a volume that have been modified during a particular epoch may be implemented via a number of bits or bytes. For instance, a bit map including a bit for each region of the volume of data may be used to identify the regions that have been modified during a particular epoch.

FIG. 4 is a diagram illustrating an example bit map that may be associated with an epoch in accordance with one embodiment. In this example, the bit map includes 36 bits, each bit representing a respective region of a volume that has, for purposes of this example, 36 regions. Each bit indicates whether the corresponding region has been modified during the corresponding epoch. More particularly, in accordance with one embodiment, when the bit is set to 1, the region has been modified during the corresponding epoch. When the bit is set to 0, the region has not been modified during the corresponding epoch.

In accordance with another aspect, MUD logging is performed by two or more network devices (or ports). Through enabling these network devices/ports to communicate with one another, redundant MUD logs may be maintained. In this manner, redundancy may be accomplished, enabling mirrors to be efficiently restored in the event of a failure.

In accordance with one embodiment, communication may be achieved via a primary (i.e., master) MUD logger and one or more other secondary MUD loggers. The primary MUD logger not only maintains its own MUD log for the volume, but is also responsible for notifying one or more other secondary MUD loggers when a modification is to be made to the MUD log maintained by the secondary MUD loggers. Stated another way, it is desirable to notify the secondary MUD loggers when modifications have been made to one or more regions of the volume (and therefore the MUD log of the primary MUD logger). More particularly, the primary MUD logger may be a master intelligent port as set forth in patent application Ser. No. 10/056,238, entitled "Methods and Apparatus for Implementing Virtualization of Storage in a Storage Area Network," by Edsall et al, filed on Jan. 23, 2002, while the other MUD logger(s) may be intelligent ports as set forth in patent application Ser. No. 10/056,238, entitled "Methods and Apparatus for Implementing Virtualization of Storage in a Storage Area Network," by Edsall et al, filed on Jan. 23, 2002.

In the following description, reference to a single master MUD logger is made. However, it is important to note that multiple master MUD loggers may be desirable. For instance, a different master MUD logger may be associated with each volume. More particularly, one or more MUD loggers (e.g., master MUD loggers) may be associated with each volume. This may be accomplished by a separate network device responsible for assigning volumes to MUD loggers (or vice versa). As another example, it may be desirable to implement redundancy in the event that a master MUD logger fails.

Figure 5:
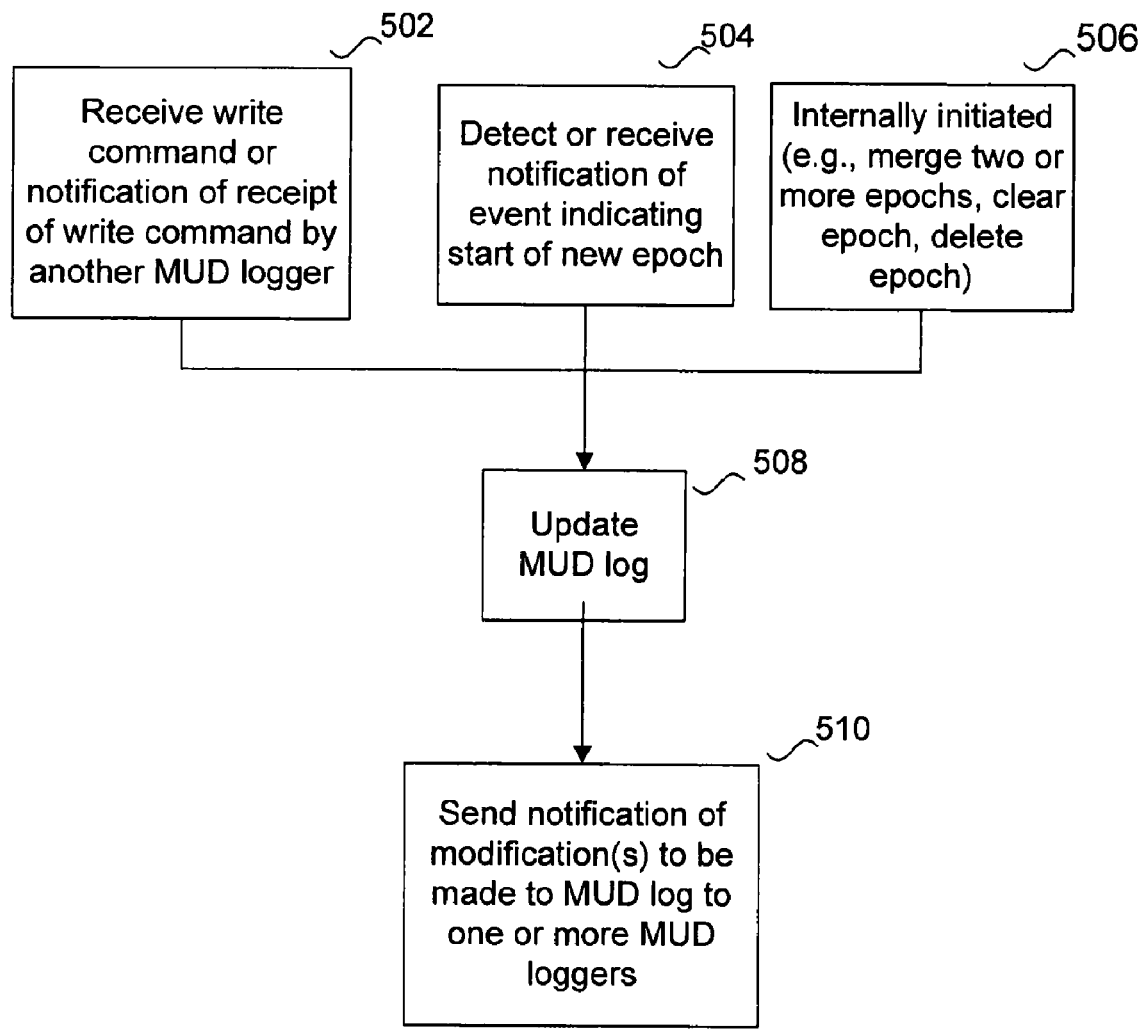
FIG. 5 is a process flow diagram illustrating a method of implementing MUD logging by a master MUD logger in accordance with one embodiment.

FIG. 5 is a process flow diagram illustrating a method of implementing MUD logging by a master MUD logger in accordance with one embodiment. The master MUD logger may initiate the change in a MUD log for a variety of reasons. One reason that a change to a MUD log may be made is a modification to one or more regions of the volume of data. More particularly, when a write command is sent to the volume, the write command may be intercepted by the master MUD logger or another MUD logger. Therefore, the master MUD logger may receive the write command or receive a notification of the receipt of a write command directed to the volume by another MUD logger at 502.

Another reason for modifying a MUD log is the initiation of a new epoch (or end of a prior epoch). More particularly, the master MUD logger may detect or receive a notification of an event indicating the start of a new epoch at 504. For instance, the master MUD logger may be notified that a particular mirror has failed or been detached from the network.

For a variety of reasons, the master MUD logger may internally initiate a particular modification to the MUD log at 506. This may be desirable, for instance, in order to consolidate information or in response to the detection of a particular event such as an event initiating the start of a new epoch. Consolidation may be accomplished, for example, by merging two or more consecutive epochs. It may also be desirable to clear or delete an epoch, such as where older epochs are deleted and/or archived to another storage medium or data structure.

Where a new epoch is initiated (or ended), the master MUD logger may modify its MUD log accordingly. This may be accomplished by generating a new data structure for the new epoch. In addition, it may be desirable to initialize the values in the new epoch data structure by "clearing" the epoch.

Moreover, where the master MUD logger merges two or more consecutive epochs, the data in the separate data structures may be "merged" and stored in a single data structure, as will be described in further detail below. The epoch data structures that are no longer in use may then be deleted or cleared.

In circumstances such as those presented in 502-506, the master MUD logger updates its MUD log at 508, as appropriate. More particularly, where the master MUD logger has received a write command or been notified of a write command addressed to the volume, the master MUD logger may update its MUD log to indicate that a particular region or regions have been modified during the epoch. This modification may be made automatically, or may be made only when the region(s) have not already been modified during the epoch. In accordance with one embodiment, the master MUD logger maintains a MUD log only for the most recent (i.e., current) epoch. In other words, when a new epoch is generated, the prior epoch is deleted or moved to a different location (e.g., bytemap).

The master MUD logger may update its MUD log via a variety of operations. These operations include, for example, initiating a new epoch and merging two or more consecutive epochs. Other operations that may be performed during MUD logging will be described in further detail below.

The master MUD logger may send a notification to one or more MUD loggers at 510, as appropriate. The notification may indicate one or more regions of the volume that have been modified during the epoch or indicate one or more modifications to be made to the MUD log. More particularly, each of the MUD logger(s) that are exporting the volume may be notified. Of course, it may be unnecessary to notify all of the MUD loggers. For instance, where the master has been notified of a write command received by another MUD logger, that MUD logger that has notified the master logger need not be notified of the write command. It may also be unnecessary to notify the other MUD logger(s) for the volume, even where a write command addressed to particular region(s) of the volume has been received. For instance, where the region(s) have already been modified during the epoch, the MUD log need not be modified and therefore the other MUD loggers need not be notified.

In other instances, the master MUD logger may send a notification indicating one or more modification(s) to be made to the MUD log(e.g., current epoch of the MUD log). Such modifications may be performed via a variety of operations on the MUD log, which will be described in further detail below. For instance, where a new epoch is initiated, the master MUD logger may send an appropriate notification. The notification may indicate that a new epoch has started, or the notification may be more specific, directing the other MUD logger(s) to generate a new epoch data structure and/or clear an epoch data structure. Similarly, the master MUD logger may send an appropriate notification to perform an operation such as merge two or more sequential epochs, delete, or clear an epoch.

Figure 6A:
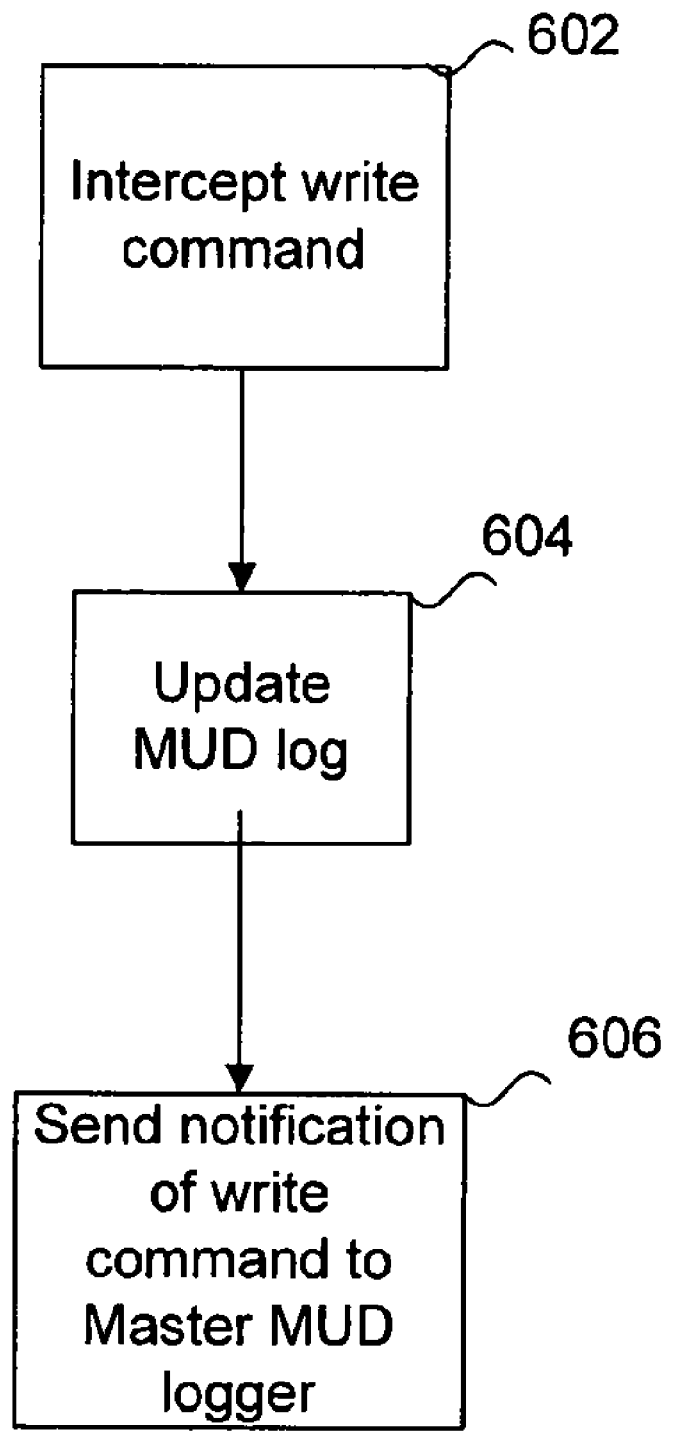
FIGS. 6A-B are process flow diagrams illustrating methods of implementing MUD logging by a non-master MUD logger in accordance with one embodiment.
Figure 6B:
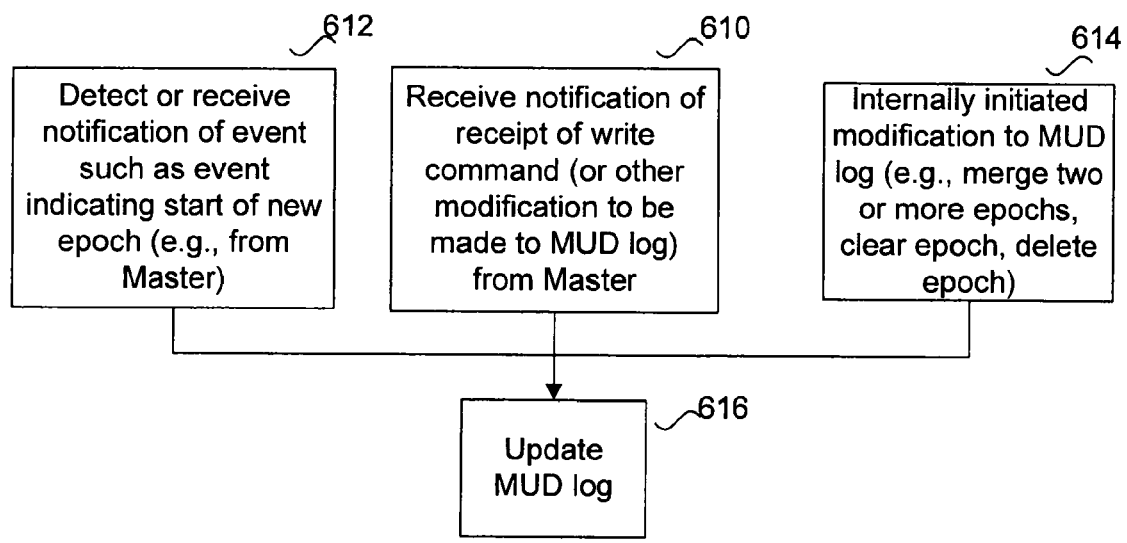

FIGS. 6A-B are process flow diagrams illustrating methods of implementing MUD logging by a non-master MUD logger in accordance with one embodiment. As shown in FIG. 6A, when the non-master MUD logger intercepts a write command at 602, the non-master MUD logger may update its MUD log to indicate that a particular region or regions have been modified during the epoch at 604. This modification may be made automatically, or may be made only when the region(s) have not already been modified during the epoch.

The non-master MUD logger may also notify the master MUD logger of the write command addressed to the region(s) of the volume as shown at 606. In accordance with one embodiment, the notification is sent during the current epoch (e.g., upon receipt of the write command). More particularly, the non-master may send a notification indicating one or more modifications to be made to the MUD log to the master MUD logger at 606, as appropriate. When the master MUD logger receives such a notification, it modifies its own MUD log and sends a notification, as appropriate, to other MUD loggers. As set forth above, the notification may indicate those region(s) that have been modified as a result of the write command. However, where the region(s) have already been modified during the epoch, the MUD log need not be modified and therefore the master MUD logger need not be notified. Alternatively, a notification may identify a subset of those regions that have been modified during the epoch (e.g., where the subset excludes those regions that have not previously been modified during the epoch).

Where the non-master MUD logger does not receive a write command, it may receive a notification of one or more modifications to be made to the MUD log or, alternatively, modifications made to the MUD log may be internally initiated. These modifications may be made via a variety of operations, which will be described in further detail below. As shown in FIG. 6B, the non-master MUD logger may receive a notification of the receipt of a write command to one or more regions of the volume (e.g., from the master MUD logger) as shown at 610. It is also possible that the non-master MUD logger may detect or receive a notification of another type of event from the master MUD logger (or other entity) at 612. Such events may include, for example, an event indicating the start of a new epoch or a request to start a new epoch. In other circumstances, it is possible that the non-master MUD logger may internally initiate a modification to its MUD log, as shown at 614. For instance, the non-master MUD logger may wish to consolidate its information by merging two or more epochs, or delete or clear an epoch.

In any of the circumstances set forth in 610-614, the non-master MUD logger may update its MUD log at 616, as appropriate. It is important to note that a notification may be received (e.g., as a result of a write command), even where the MUD log need not be updated (e.g., if the region(s) have already been modified during the epoch). Alternatively, the non-master MUD logger may update information for the epoch in response to the notification for at least one of the regions that has been modified during the corresponding epoch, as appropriate. In other words, the information that is updated may be only for those regions that have not previously been modified during the current epoch.

The non-master and master MUD loggers may each make a variety of modifications to the MUD log that it maintains. These modifications may be made via a variety of operations, which will be described in further detail below. For instance, a MUD logger may update its MUD log associated with the volume to indicate that the region(s) that have been modified (e.g., written to) during the current epoch. In this manner, information for the current epoch may be updated by logging the segment(s) that have been modified during the current epoch.

Other operations may be performed to modify a MUD log. As one example, a new epoch may be generated. Moreover, information for one or more epochs may be cleared or deleted. Thus, an entire MUD log may be deleted or cleared. As another example, the information for two or more epochs may be merged, where the epochs being merged are contiguous epochs. Additional examples will be described in further detail below.

As set forth above, a MUD log includes information for one or more epochs, where the information for each of the epochs indicates a set of one or more regions that have been modified during the corresponding epoch. More particularly, the information for each epoch identifying the set of regions that have been modified during the corresponding epoch may include a bit map. For instance, the bit map may include a bit for each of a plurality of regions in the volume.

In accordance with one embodiment, a bit map is maintained for the current epoch, while a byte map is maintained for prior epochs. More particularly, the byte map includes a byte for each region of the volume, enabling the byte to include data for the latest epoch for which the region was written to.

FIGS. 7A and 7B together illustrate the application of a merge operation on a MUD log. FIG. 7A is an example diagram illustrating the information for two different epochs, Epoch A and Epoch B. In this example, the information for each epoch is implemented via a bit map. For instance, each region of the volume may correspond to a different bit in the bit map, where each bit indicates whether the corresponding region has been modified during the epoch. In accordance with one embodiment, the bit is set to "1" when the region has been modified during the epoch. The bit remains set to a "0" (as initialized) when the region has not been modified during the epoch.

FIG. 7B is an example diagram illustrating a mechanism for merging two or more contiguous epochs. In other words, the epochs are merged into a single epoch spanning the time periods of the merged epochs. In order to merge two or more epochs, an OR operation may be performed on the bit maps for the two or more epochs. In this manner, the information for the epochs may be merged into a single bit map. In this example, Epoch A and Epoch B are merged by performing an OR operation on the bit maps, resulting in a third bit map, as shown. Epoch A and Epoch B may then be deleted or cleared.

Other operations may also be performed during MUD logging. For instance, it may be desirable to generate a MUD log (e.g., which may include zero or more epochs), delete a MUD log, or clear a MUD log. A MUD log may be generated, for example, by generating a MUD log data structure via instantiation. Each epoch may be implemented via a bit map, where the bits in the bit map are initialized to zero. A MUD log may be deleted or cleared, for example, by deleting all epochs (e.g., bit maps) in the MUD log.

In certain circumstances, it may be desirable to generate (i.e., initiate) a new epoch. In accordance with one embodiment, each epoch is implemented by a data structure such as a bitmap. In order to initialize the epoch, the bits in the bitmap may be initialized to zero. A new epoch that is generated may then be made the current epoch. In other circumstances, it may be desirable to delete one or more epochs. For instance, the oldest epoch(s) may be deleted in order to remove outdated information. This may be accomplished by deleting the bitmap for the corresponding epoch(s).

Logging of one or more segments to the current epoch is performed when a write command is performed. Logging may include, for example, setting one or more bits of the current epoch bitmap to "1." More particularly, the bit corresponding to each segment of the volume that has been modified is set to "1."

Once logging has been performed, it may also be desirable to identify the next segment that has been modified during one of the epochs. For instance, it may be desirable to search a bit map for bits having the value of "1" to identify those segments of the volume that have been modified during the epoch. Where the epoch was initiated upon failure of a mirror, the data from these segments may then be used to update the mirror at the end of the epoch (e.g., when the mirror is reattached).

In order to conserve memory, it may be desirable to move information associated with a MUD log or portion thereof to another location. This may be accomplished by taking a snapshot of a MUD log. More particularly, taking a snapshot may involve saving a copy of the MUD log to a storage device or saving the copy in a compressed format.

In the above-described embodiments, certain modifications to MUD logs and corresponding notifications received and transmitted by the MUD loggers are described. However, it is important to note that these examples are merely illustrative, and therefore other modifications and corresponding notifications are contemplated. Moreover, although the examples set forth relate to mirroring, the disclosed embodiments may be used to maintain MUD logs for a number of epochs corresponding to a variety of events.

Figure 8A:
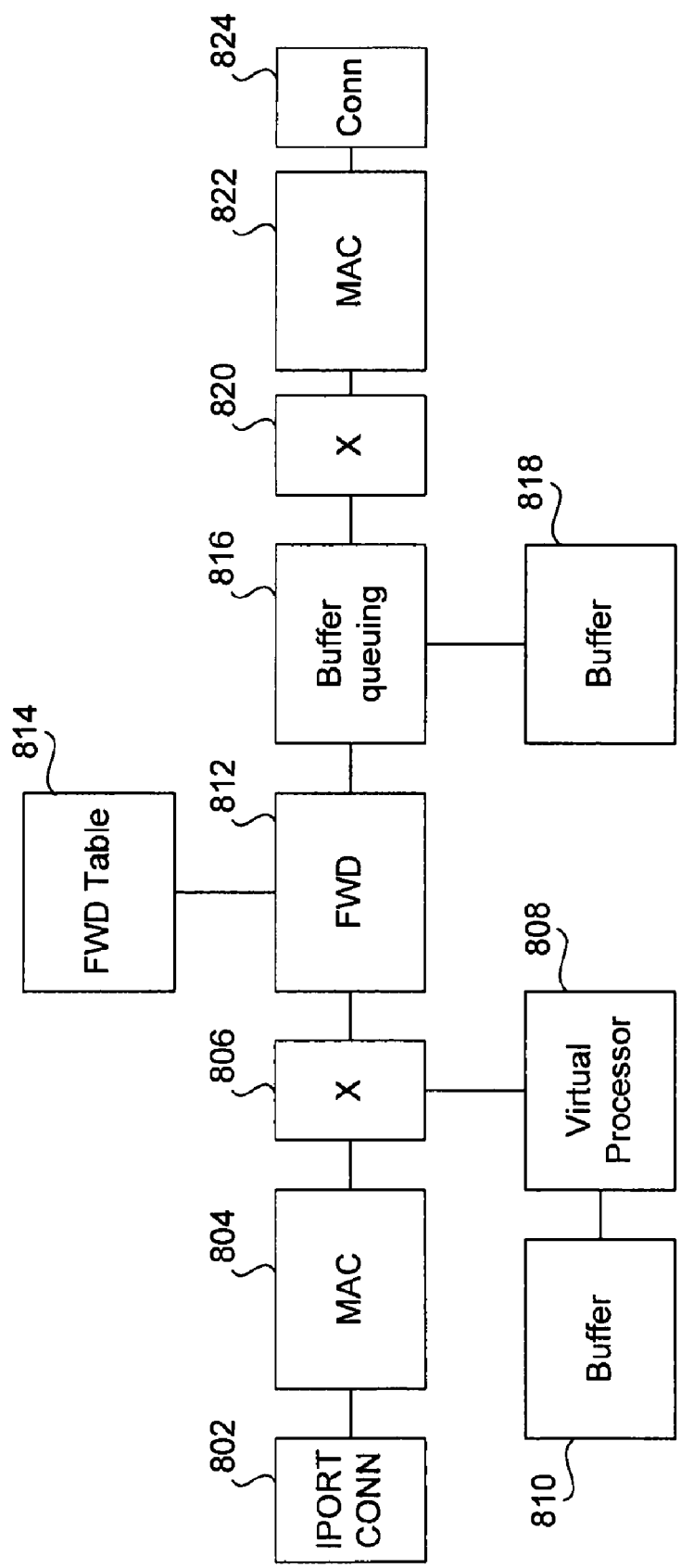
FIG. 8A is a block diagram illustrating an example virtualization switch in which various embodiments may be implemented.

Various network devices may be configured or adapted for performing the disclosed functionality. These network devices include, but are not limited to, servers (e.g., hosts), routers, and switches. Moreover, the functionality for the disclosed processes may be implemented in software as well as hardware. In accordance with various embodiments, various switches within a storage area network may be virtualization switches supporting virtualization functionality. FIG. 8A is a block diagram illustrating an example virtualization switch in which various embodiments may be implemented. As shown, data is received by an intelligent, virtualization port via a bi-directional connector 802. In association with the incoming port, Media Access Control (MAC) block 804 is provided, which enables frames of various protocols such as Ethernet or fibre channel to be received. In addition, a virtualization intercept switch 806 determines whether an address specified in an incoming frame pertains to access of a virtual storage location of a virtual storage unit representing one or more physical storage locations on one or more physical storage units of the storage area network. In this example, the frame is received via a bi-directional connector 802 and the new or modified frame exits from the switch fabric 820. However, it is important to note that a virtualization switch may be implemented in an alternate manner. For instance, the frame may be received from the fabric 820, redirected by 806 to 808, virtualized and sent back to the switch fabric 820. This is important when a host and disk are connected to a standard line card such as that illustrated in FIG. 8B, and the host and disk share several virtualization cards such as that illustrated in FIG. 8A.

When the virtualization intercept switch 806 determines that the address specified in an incoming frame pertains to access of a virtual storage location rather than a physical storage location, the frame is processed by a virtualization processor 808 capable of performing a mapping function such as that described above. More particularly, the virtualization processor 808 obtains a virtual-physical mapping between the one or more physical storage locations and the virtual storage location. In this manner, the virtualization processor 808 may look up either a physical or virtual address, as appropriate. For instance, it may be necessary to perform a mapping from a physical address to a virtual address or, alternatively, from a virtual address to one or more physical addresses.

Once the virtual-physical mapping is obtained, the virtualization processor 808 may then employ the obtained mapping to either generate a new frame or modify the existing frame, thereby enabling the frame to be sent to an initiator or a target specified by the virtual-physical mapping. For instance, a frame may be replicated multiple times in the case of a mirrored write. This replication requirement may be specified by a virtual-physical mapping function. In addition, the source address and/or destination addresses are modified as appropriate. For instance, for data from the target, the virtualization processor replaces the source address, which was originally the physical LUN address with the corresponding virtual LUN and virtual address.

In the destination address, the port replaces its own address with that of the initiator. For data from the initiator, the port changes the source address from the initiator's address to the port's own address. It also changes the destination address from the virtual LUN/address to the corresponding physical LUN/address. The new or modified frame may then be provided to the virtualization intercept switch 306 to enable the frame to be sent to its intended destination.

While the virtualization processor 808 obtains and applies the virtual-physical mapping, the frame or associated data may be stored in a temporary memory location (e.g., buffer) 810. In addition, it may be necessary or desirable to store data that is being transmitted or received until it has been confirmed that the desired read or write operation has been successfully completed. As one example, it may be desirable to write a large amount of data to a virtual LUN, which must be transmitted separately in multiple frames. It may therefore be desirable to temporarily buffer the data until confirmation of receipt of the data is received. As another example, it may be desirable to read a large amount of data from a virtual LUN, which may be received separately in multiple frames. Furthermore, this data may be received in an order that is inconsistent with the order in which the data should be transmitted to the initiator of the read command. In this instance, it may be beneficial to buffer the data prior to transmitting the data to the initiator to enable the data to be re-ordered prior to transmission. Similarly, it may be desirable to buffer the data in the event that it is becomes necessary to verify the integrity of the data that has been sent to an initiator (or target).

The new or modified frame is then received by a forwarding engine 812, which obtains information from various fields of the frame, such as source address and destination address. The forwarding engine 812 then accesses a forwarding table 814 to determine whether the source address has access to the specified destination address. More specifically, the forwarding table 814 may include physical LUN addresses as well as virtual LUN addresses. The forwarding engine 812 also determines the appropriate port of the switch via which to send the frame, and generates an appropriate routing tag for the frame.

Once the frame is appropriately formatted for transmission, the frame will be received by a buffer queuing block 816 prior to transmission. Rather than transmitting frames as they are received, it may be desirable to temporarily store the frame in a buffer or queue 818. For instance, it may be desirable to temporarily store a packet based upon Quality of Service in one of a set of queues that each correspond to different priority levels. The frame is then transmitted via switch fabric 820 to the appropriate port. As shown, the outgoing port has its own MAC block 822 and bi-directional connector 824 via which the frame may be transmitted.

One or more ports of the virtualization switch (e.g., those ports that are intelligent virtualization ports) may implement the disclosed MUD logging functionality. For instance, virtualization processor 808 of a port that implements virtualization functionality may also perform MUD logging functionality such as that disclosed herein. Of course, this example is merely illustrative. Therefore, it is important to note that a port or network device that implements MUD logging functionality may be separate from a port or network device that implements virtualization functionality.

Figure 8B:
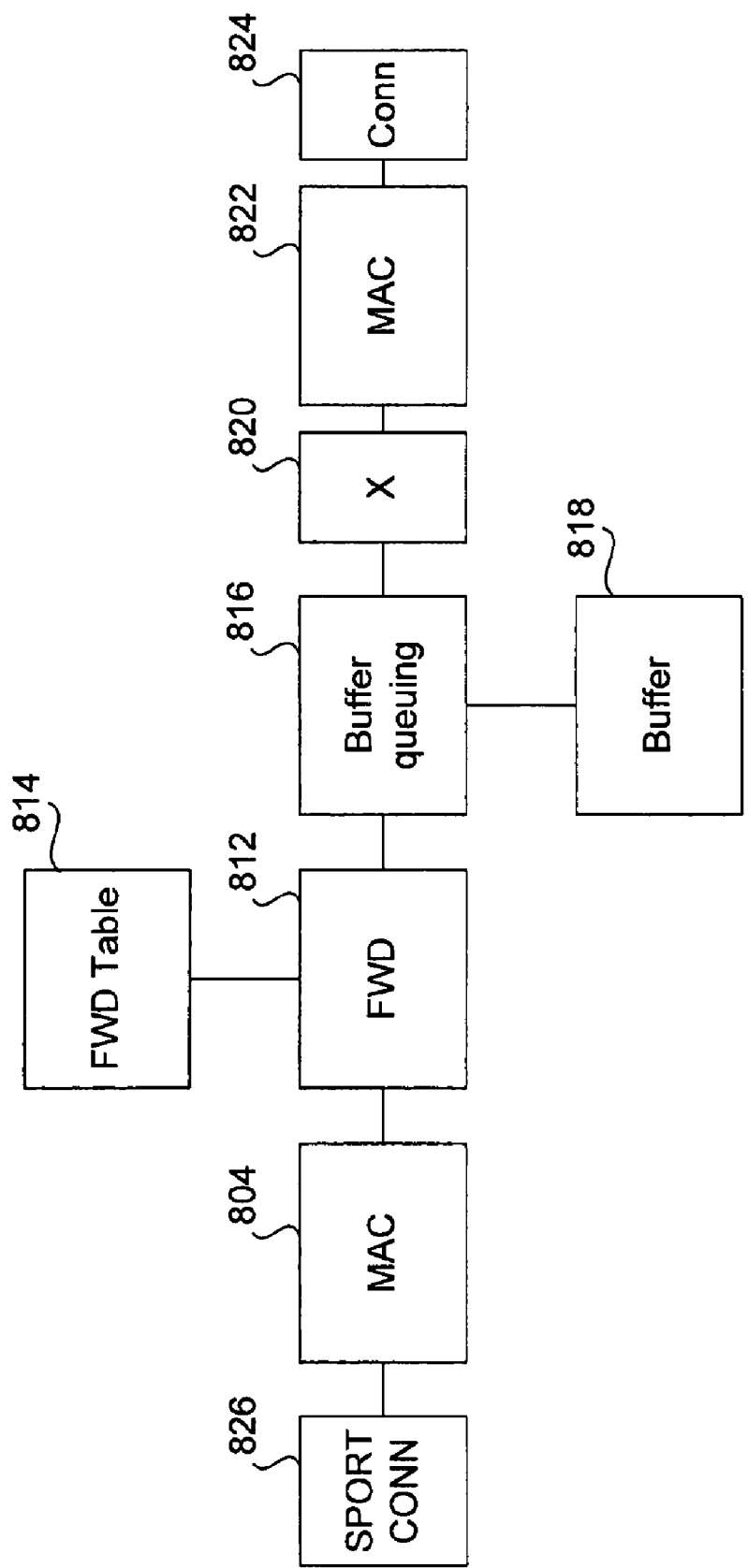
FIG. 8B is a block diagram illustrating an example standard switch in which various embodiments may be implemented.

As described above, all switches in a storage area network need not be virtualization switches. In other words, a switch may be a standard switch in which none of the ports implement "intelligent," virtualization functionality. FIG. 8B is a block diagram illustrating an example standard switch in which various embodiments may be implemented. As shown, a standard port 826 has a MAC block 804. However, a virtualization intercept switch and virtualization processor such as those illustrated in FIG. 8A are not implemented. A frame that is received at the incoming port is merely processed by the forwarding engine 812 and its associated forwarding table 814. Prior to transmission, a frame may be queued 816 in a buffer or queue 818. Frames are then forwarded via switch fabric 820 to an outgoing port. As shown, the outgoing port also has an associated MAC block 822 and bi-directional connector 824.

As described above, the disclosed embodiments may be implemented, at least in part, by a virtualization switch. Virtualization is preferably performed on a per-port basis rather than per switch. Thus, each virtualization switch may have one or more virtualization ports that are capable of performing virtualization functions, as well as ports that are not capable of such virtualization functions. In one embodiment, the switch is a hybrid, with a combination of line cards as described above with reference to FIG. 8A and FIG. 8B.

Although the network devices described above with reference to FIGS. 8A and 8B are described as switches, these network devices are merely illustrative. Thus, other network devices such as routers may be implemented to perform functionality such as that described above. Moreover, the above-described network devices are merely illustrative, and therefore other types of network devices may be implemented to perform the disclosed MUD logging functionality.

The disclosed embodiments may also be implemented via computer program products including machine-readable media on which are provided program instructions for implementing the methods and techniques described above, in whole or in part. Any of the methods of the disclosed embodiments may be represented, in whole or in part, as program instructions that can be provided on such machine-readable media. In addition, the disclosed embodiments pertain to various combinations and arrangements of data generated and/or used as described herein.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments would apply regardless of the context and system in which it is implemented. Thus, broadly speaking, the disclosed embodiments need not be performed using the operations or data structures described above.

In addition, although an example switch is described, the above-described embodiments may be implemented in a variety of network devices (e.g., servers) as well as in a variety of mediums. For instance, instructions and data for implementing the above-described embodiments may be stored on a disk drive, a hard drive, a floppy disk, a server computer, or a remotely networked computer. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
   updating a Modified User Data (MUD) log associated with a volume by a MUD logger; and
   sending a notification to one or more other MUD loggers, wherein each of the one or more other MUD loggers maintains a different one of one or more additional MUD logs associated with the volume, the notification indicating one or more modifications that have been made to the MUD log, wherein the MUD log includes information for one or more epochs, wherein the information for each of the epochs indicates a set of one or more regions of the volume that have been modified during the corresponding epoch.

2. The method as recited in claim 1, wherein sending the notification is performed in order to ensure that the one or more additional MUD logs each includes the information for the one or more epochs.

3. The method as recited in claim 1, wherein the notification indicates one or more of the regions that have been modified during a current epoch.

4. The method as recited in claim 3, wherein the notification is sent only when the one or more regions have not previously been modified during the current epoch.

5. The method as recited in claim 1, wherein sending a notification comprises:
   sending a notification by a secondary MUD logger during a current epoch to a primary MUD logger, the notification being a notification of a write command addressed to one or more regions of the volume, wherein the write command has been intercepted by the secondary MUD logger.

6. The method as recited in claim 5, wherein the notification is sent only when the regions have not previously been modified during the current epoch.

7. A method, comprising:
   receiving a notification by a Modified User Data (MUD) logger from another MUD logger maintaining another MUD log for a volume, the notification indicating one or more modifications to be made to a MUD log maintained by the MUD logger receiving the notification, wherein the MUD log includes information for one or more epochs, wherein the information for each of the epochs indicates a set of one or more regions of the volume that have been modified during the corresponding epoch; and
   updating by the MUD logger the MUD log associated with the volume, wherein updating the MUD log is performed in response to the notification.

8. The method as recited in claim 7, where the notification indicates one or more of the regions that have been modified during a current epoch, and wherein updating the MUD log includes updating the information for the current epoch.

9. The method as recited in claim 7, wherein updating the MUD log comprises:
   updating the information for one of the epochs for at least one of the regions that has been modified during the corresponding epoch.

10. The method as recited in claim 7, wherein the notification is a notification of a write command to a region of the volume.

11. An apparatus, comprising:
    a processor; and
    a memory, at least one of the processor or the memory being adapted for:

updating a Modified User Data (MUD) log associated with a volume; and sending a notification to one or more other MUD loggers, wherein each of the one or more other MUD loggers maintains a different one of one or more additional MUD logs associated the volume, the notification indicating one or more modifications that have been made to the MUD log, wherein the MUD log includes information for one or more epochs, wherein the information for each of the epochs indicates a set of one or more regions of the volume that have been modified during the corresponding epoch.

12. The apparatus as recited in claim 11, wherein the notification indicates one or more operations that have been performed on the MUD log, wherein the operations include at least one of generating a new epoch in the MUD log, deleting the information for one or more of the epochs in the MUD log, merging two or more contiguous epochs in the MUD log, deleting the MUD log, logging one or more of the regions that have been modified during one of the epochs of the MUD log, clearing the MUD log, or creating the MUD log.

13. The apparatus as recited in claim 11, wherein updating the MUD log comprises:

updating the MUD log associated with the volume to indicate that at least one of the regions have been modified during a current epoch.

14. The apparatus as recited in claim 11, wherein sending a notification comprises sending a notification by a primary MUD logger during a current epoch, the notification being a notification of a write command addressed to at least one region of the volume, wherein the write command was intercepted by the primary MUD logger or made known to the primary MUD logger by one of the other MUD loggers.

15. The apparatus as recited in claim 11, wherein sending a notification comprises:

sending a notification during a current epoch of a write command to a region of the volume.

16. The apparatus as recited in claim 11, at least one of the processor or the memory being further adapted for:

detecting an event initiating the start of a new epoch or receiving a notification of an event initiating the start of a new epoch.

17. The apparatus as recited in claim 11, wherein each of the one or more additional MUD logs includes second information for the one or more epochs, wherein the second information for each of the epochs indicates a set of one or more regions of the volume that have been modified during the corresponding epoch.

18. The apparatus as recited in claim 17, wherein sending the notification is performed in order to cause the one or more other MUD loggers to modify the second information to conform to the information in the MUD log.

19. An apparatus, comprising:

a processor; and a memory, at least one of the processor or the memory being adapted for:

receiving a notification by a Modified User Data (MUD) logger from another MUD logger maintaining another MUD log for a volume, the notification indicating one or more modifications to be made to a MUD log maintained by the MUD logger receiving the notification, wherein the MUD log includes information for one or more epochs, wherein the information for each of the epochs indicates a set of one or more regions of the volume that have been modified during the corresponding epoch; and updating the MUD log associated with the volume, wherein updating the MUD log is performed in response to the notification.

20. The apparatus as recited in claim 19, wherein the MUD logger and the another MUD logger are ports.

21. The apparatus as recited in claim 19, wherein updating includes at least one of deleting the MUD log, logging one or more of the regions that have been modified during one of the epochs of the MUD log, obtaining a snapshot of the MUD log, clearing the MUD log, or creating the MUD log, wherein the MUD log that is created includes zero or more epochs.

22. The apparatus as recited in claim 19, wherein updating comprises:

deleting or clearing the information for one or more of the epochs.

23. The apparatus as recited in claim 19, wherein updating comprises:

merging the information for two or more of the epochs, wherein the two or more epochs are contiguous epochs.

24. The apparatus as recited in claim 19, wherein the notification is a request to start a new epoch and wherein updating includes generating a new epoch in the MUD log.

25. An apparatus, comprising:

means for updating a first a Modified User Data (MUD) log associated with a volume; and means for sending a notification to a second MUD logger, the notification indicating one or more modifications to be made to a second MUD log maintained by the second MUD logger receiving the notification, wherein the first MUD log and the second MUD log each includes information for one or more epochs indicating regions of the volume that have been modified during the corresponding epoch.

* * * * *